UNITED STATES PATENT OFFICE.

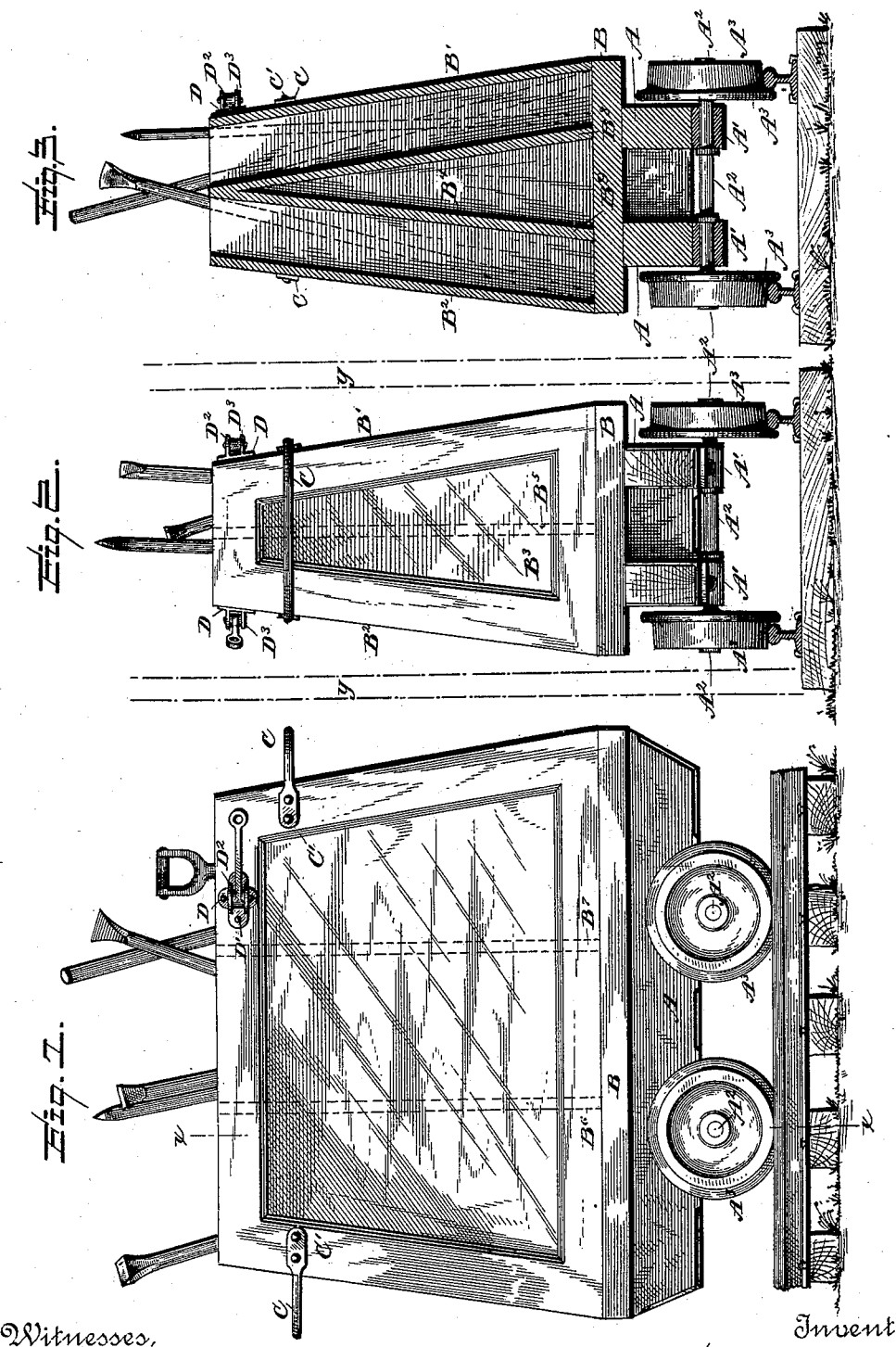

JOSEPH TREWEEK, OF LEAD CITY, DAKOTA TERRITORY.

TOOL-CAR FOR MINES.

SPECIFICATION forming part of Letters Patent No. 404,510, dated June 4, 1889.

Application filed February 20, 1889. Serial No. 300,529. (No model.)

*To all whom it may concern:*

Be it known that I, JOSEPH TREWEEK, a citizen of the United States, residing at Lead City, in the county of Lawrence, Territory of Dakota, have invented certain new and useful Improvements in Tool-Cars for Mines and Similar Places, of which the following is a specification, reference being had therein to the accompanying drawings.

This invention has relation to cars for carrying drills, picks, and other tools in mines and similar places, the main object being the provision of a car so constructed that when going up and down shafts and through adits of mines the tools shall not strike the walls thereof, as has heretofore been the case, thus endangering the lives of the workmen and causing at times the destruction of cars and elevators.

Other objects and advantages of the invention will appear in the following description, and the novel features thereof will be particularly pointed out in the claims.

Referring to the drawings, Figure 1 is a side elevation of a car constructed in accordance with my invention. Fig. 2 is an end elevation showing the same in the adit of a mine, the latter being indicated by dotted lines $y\ y$. Fig. 3 is a vertical transverse section of a modified form taken on the line $x\ x$ of Fig. 1.

Like letters refer to like parts in all the figures of the drawings.

A represents the truck of the car, which is provided with the bearing-blocks $A'$ for the reception of the axles $A^2$, said axles being provided with the wheels $A^3$, all being of the usual construction.

To the truck A of the car is secured by suitable means the floor B of the car. Fastened to the floor B are inwardly-projecting side and end walls $B'$, $B^2$, $B^3$, and $B^4$, respectively. The interior of the car is provided with the longitudinal partition $B^5$, (shown by dotted lines in Fig. 2,) extending the entire length of the car and from top to bottom thereof, which divides the car into two main compartments. The interior of the car is also subdivided into compartments by the partitions $B^6$ $B^7$ (see dotted lines in Fig. 1) for the reception of tools.

Referring now to Fig. 3, which is a modified construction, instead of using the single main partition $B^5$, I provide a partition which is substantially of inverted-V shape, being made in two parts $B^8$ and $B^9$. At the ends of the car I have provided hand-holds C, which are bolted to the sides of the car, as at $C'$, so that the car can be propelled by hand either backward or forward in the mines; or gearing may be attached to the car for horse-power. On the side of the car is attached a fastening-bracket D, to hold the car in position in an adit or on an elevator when being loaded with tools. The device consists of a plate provided with perforations for the reception of bolts or rivets $D'$, by which it can be fastened to the side of the car. The fastening-bracket D is provided with the upper and lower lips $D^2$ $D^3$, respectively, through which and the loop or eye of any ordinary link a pin may be passed to connect the link to the car.

From the above description it will be seen that I construct a car with a top of a less area than the bottom in this instance by inwardly projecting the side and end walls, so that when tools are placed therein they will be prevented by the peculiar shape of the car from striking the walls of the mine and other places where the same is used.

What I claim is—

1. A tool-car having the upper edges of its body disposed within the area of its bottom, substantially as specified.

2. A tool-car for mines, having inwardly-inclined side and end walls, substantially as specified.

3. A tool-car for mines, consisting of inwardly-projecting side and end walls, the body thereof being divided into compartments for the reception of tools, substantially as specified.

4. A tool-car for mines and similar places, consisting of inwardly-projecting side and end walls, the body thereof being divided into compartments, the opposite walls of which are inclined for the reception of tools, substantially as specified.

5. The combination, with a car for use in mines and similar places, consisting of the side and end walls projecting inwardly toward their top, divided into compartments for the reception of tools, of fastening-brackets at the sides thereof to hold the car on an elevator, substantially as specified.

6. The combination, in a car for carrying tools, consisting of the side and end walls projecting inwardly toward their top, of fastening-brackets at the sides thereof, and hand-holds at the ends for propelling the car backward and forward, substantially as specified.

In testimony whereof I affix my signature in presence of two witnesses.

JOSEPH TREWEEK.

Witnesses:
T. J. GRIER,
ALEXANDER LAWIE.